United States Patent
Zhang et al.

(10) Patent No.: US 9,962,794 B2
(45) Date of Patent: May 8, 2018

(54) FLUX CORED WELDING ELECTRODE FOR 5-9% NICKEL STEEL

(71) Applicant: Lincoln Global, Inc., City of Industry, CA (US)

(72) Inventors: Zhuyao Zhang, Woking (GB); Vincent van der Mee, Nijmegen (NL); Peter van Erk, Raamsdonksveer (NL); Mark Buxton, Surrey (GB)

(73) Assignee: LINCOLN GLOBAL, INC., City of Industry, CA (US)

( * ) Notice: Subject to any disclaimer, the term of this patent is extended or adjusted under 35 U.S.C. 154(b) by 69 days.

(21) Appl. No.: 14/484,425

(22) Filed: Sep. 12, 2014

(65) Prior Publication Data

US 2015/0076130 A1    Mar. 19, 2015

Related U.S. Application Data

(60) Provisional application No. 61/878,089, filed on Sep. 16, 2013.

(51) Int. Cl.
| | |
|---|---|
| *B23K 9/00* | (2006.01) |
| *B23K 35/02* | (2006.01) |
| *B23K 35/362* | (2006.01) |
| *B23K 9/16* | (2006.01) |
| *B23K 9/173* | (2006.01) |
| *B23K 35/30* | (2006.01) |
| *B23K 35/38* | (2006.01) |
| *C22C 19/05* | (2006.01) |

(52) U.S. Cl.
CPC .............. *B23K 35/362* (2013.01); *B23K 9/16* (2013.01); *B23K 9/173* (2013.01); *B23K 35/0266* (2013.01); *B23K 35/304* (2013.01); *B23K 35/38* (2013.01); *C22C 19/056* (2013.01)

(58) Field of Classification Search
CPC ....... B23K 35/26–35/3093; B23K 9/16; B23K 9/173; C22C 19/056
USPC ............... 219/136, 137 R, 145.1–145.32, 219/146.1–146.51
See application file for complete search history.

(56) References Cited

U.S. PATENT DOCUMENTS

| | | | |
|---|---|---|---|
| 2,785,285 A | 3/1957 | Bernard | |
| 2,858,208 A * | 10/1958 | Spooner | C22C 19/058 338/334 |
| 2,944,142 A | 7/1960 | Sjoman | |
| 3,218,432 A * | 11/1965 | Peck | B23K 35/3066 219/137 R |
| 3,534,390 A | 10/1970 | Woods et al. | |
| 3,902,039 A * | 8/1975 | Lang | B23K 35/3066 219/146.1 |
| 4,010,309 A * | 3/1977 | Petersen | B23K 35/302 148/23 |
| 4,072,845 A * | 2/1978 | Buckingham | B23K 35/368 219/146.3 |
| 5,171,968 A * | 12/1992 | Bates | B23K 35/365 219/146.22 |
| 6,160,241 A * | 12/2000 | Stava | B23K 9/0216 219/130.21 |
| 6,623,869 B1 * | 9/2003 | Nishiyama | B32B 15/01 138/143 |
| 6,784,401 B2 * | 8/2004 | North | B23K 35/368 219/145.22 |
| 7,491,910 B2 * | 2/2009 | Kapoor | B23K 35/0261 219/145.1 |
| 2002/0008096 A1 * | 1/2002 | Kim | B23K 35/3086 219/145.22 |
| 2003/0080096 A1 | 5/2003 | Yamaguchi et al. | |

FOREIGN PATENT DOCUMENTS

| | | |
|---|---|---|
| DE | 1483466 B1 | 10/1971 |
| DE | 19521110 | 1/1996 |
| DE | 10334677 | 11/2004 |
| EP | 824992 | 2/1998 |
| FR | 1389041 A | 2/1965 |
| GB | 1018149 A | 1/1966 |
| JP | 58-132393 | 8/1983 |
| JP | 10-296486 | 11/1998 |
| JP | 2003-164988 | 6/2003 |

OTHER PUBLICATIONS

International Search Report and Written Opinion from PCT/IB2014/001317 dated Jan. 12, 2015.
Preliminary Report of Patentability from International Application No. PCT/IB2014/001833, dated Mar. 22, 2016.
Office Action from Japanese Patent Application No. 2016-542391 dated Feb. 27, 2018.

* cited by examiner

*Primary Examiner* — Sang Y Paik
(74) *Attorney, Agent, or Firm* — Calfee, Halter & Griswold LLP

(57) ABSTRACT

A flux cored welding electrode for welding a 5-9% nickel steel workpiece by a flux cored arc welding (FCAW) process comprises a particulate core and a metal sheath surrounding the particulate core, wherein chemical composition of the metal sheath and the chemical composition of the particulate core are selected so that the weld deposit composition produced by the welding electrode comprises ≤0.15 C, ≤6.0 Mn, ≤1.0 Si, ≤0.025 P, ≤0.020 S, 12.0-20.0 Cr, ≥55.0 Ni, 5.5-7.5 Mo, 1.2-1.8 Nb+Ta, ≤12 Fe, ≤0.3 Cu and 0.5-4.0 W.

18 Claims, No Drawings

FLUX CORED WELDING ELECTRODE FOR 5-9% NICKEL STEEL

RELATED APPLICATIONS

The present application claims the benefit of U.S. Provisional Patent Application Ser. No. 61/878,089, filed on Sep. 16, 2013, titled "Flux Corred Welding Electrode for 5-9% Nickel Steel." U.S. Provisional Patent Application Ser. No. 61/878,089 is incorporated herein by reference in its entirety.

BACKGROUND

The inner shell of a storage tank for liquefied natural gas ("LNG") is normally made from 5-9% nickel steel due to its excellent combination of high strength and satisfactory impact toughness at very low temperature, e.g., −196° C.

When such a tank is constructed on-site, the individual steel sheets forming the tank interior are normally joined by welding. Horizontally-oriented seams are primarily welded using automatic welding processes, using ERNiCrMo3 and ERNiCrMo4 submerged arc flux/wire combinations.

In contrast, most vertically-oriented seams are welded manually by shielded metal arc welding (SMAW), which is also known as "stick" welding. This is because the vertical welds that are produced by current automatic welding processes are less than ideal in operability, strength, impact toughness at −196° C., susceptibility to welding hot cracking or bead shape.

In this regard, weld beads that are produced when adjacent sheets of 5-9% nickel steel are welded are desirably as flat as possible in the sense of being neither concave nor convex when viewed in transverse cross section. In addition, they should also be as uniform as possible from region to region, i.e., along their entire lengths. Vertical welds in 5-9% nickel steel workpieces are normally made manually, because of the flexibility this type of welding allows. For example, electrode angle and location inside the seam, welding speed, dwell time, etc. can be varied, allowing an experienced welder to produce a "perfect" weld bead along the entire length of the seam. Automatic welding machines do not have this flexibility. Furthermore, the stick electrode normally used for manual welding of 5-9% nickel steel, ENiCrMo-6, is significantly different from the existing flux cored welding electrodes used by automatic welding processes, both in terms of the metal from which it is made as well as the flux. This difference is also believed to play a role in the superiority of the vertical welds produced by manual welding.

SUMMARY

In accordance with this invention, it has been found that vertical welds in high nickel steel workpieces that exhibit a desirable combination of properties, including strength, impact toughness at −196° C., resistance to welding hot cracking and bead shape, can be produced by automatic welding processes, provided that the flux cored welding electrode that is used for this purpose has a particular chemical composition.

Thus, this invention provides a new flux cored welding electrode for welding a 5-9% nickel steel workpieces by flux cored arc welding (FCAW) process, the flux cored welding electrode comprising a particulate core and a metal sheath surrounding the particulate core, wherein chemical composition of the metal sheath and the chemical composition of the particulate core are selected so that the weld deposit composition produced by the welding electrode comprises ≤0.15 C, ≤6.0 Mn, ≤1.0 Si, ≤0.025 P, ≤0.020 S, 12.0-20.0 Cr, ≥55.0 Ni, 5.5-7.5 Mo, 1.2-1.8 Nb+Ta, ≤12 Fe, ≤0.3 Cu and 0.5-4.0 W.

DETAILED DESCRIPTION

5-9% Nickel Steel

This invention is intended primarily for use in welding 5-9% nickel steels in the construction of storage tanks for liquified natural gas (LNG). These steels exhibit excellent strength and good impact toughness at the very low temperatures encountered in the storage and handling of LNG.

5-9% nickel steels useful for this purpose are well-known. Examples include A353 or A553 (EN 10028-4, X8Ni9) and A202 or A333 (EN10028-4, 12Ni19, 10Ni14, 12Ni14) Typically, they contain 5 to 9 wt. % nickel.

This invention finds particular applicability to welding any steel which has previously been used, or which may be used in the future, for making storage tanks for LNG.

Structure

The inventive welding electrode has the same structure as a conventional flux cored welding electrode in that it is comprises a core formed from a mixture of particulate ingredients and an outer metal sheath surrounding the core. Its structure, then, is the reverse of the structure of a conventional stick electrode such as ENiCrMo-6, for example, in which the solid metal element of the electrode is a wire core and the particulate additives which complement this solid metal element are present as a coating on this wire core.

The inventive flux cored welding electrode may be made in a conventional way, such as by beginning with a flat metal strip that is initially formed first into a "U" shape, for example, as shown in Bernard U.S. Pat. No. 2,785,285, Sjoman U.S. Pat. No. 2,944,142, and Woods U.S. Pat. No. 3,534,390. Flux, alloying elements, and/or other core fill materials in particulate form are then deposited into the "U" and the strip is closed into a tubular configuration by a series of forming rolls. Normally, the tube so formed is then drawn through a series of dies to reduce its cross-section to a final desired diameter, after which the electrode so formed is then coated with a suitable feeding lubricant, wound onto a spool, and then packaged for shipment and use.

As well understood in the art, during welding, the intense heat developed by the welding process accomplishes three separate tasks, all of which are essential to the formation of a satisfactory weld. First, it melts the metal components of the electrode for forming the weld bead. Second, it vaporizes a portion of the flux to produce an additional gas shield which protects the molten metal from atmospheric oxygen and nitrogen. Third, it melts the remainder of the flux to produce an extensive slag cover which protects and shapes the weld bead as it cools.

Weld Deposit Composition

The inventive flux cored welding electrode is formulated so that the undiluted weld produced by this electrode has the chemical composition set forth in the following Table 1. As appreciated in the art, the undiluted weld deposit composition of a welding electrode is the composition of the weld produced without contamination from any other source. It is normally different from the chemical composition of the weld metal obtained when the electrode is used to weld a workpiece, which weld metal can typically be diluted with as much as 20%, of the base material being welded.

For comparison, the weld deposit composition of the stick electrode normally used for manual welding of vertical welds in 5-9% nickel steel, ENiCrMo-6, as well as the weld deposit compositions of the flux cored electrodes normally used for automatic welding of horizontal welds in 5-9% nickel steel, ENiCrMo-3 and ENiCrMo-4, are also included in Table 1.

Core

The particulate core of the inventive flux cored welding electrode is made from three distinctly different types of ingredients (1) slag forming ingredients, (2) metal alloy powders and compounds which contribute to the chemical composition of the weld being formed, and (3) ingredients which deoxidize and denitrify. The chemical composition of this core is set forth in the following Table 2. For the purposes of comparison, the chemical composition of the particulate flux which coats the exterior surfaces of stick electrode ENiCrMo-6 is also provided in Table 2.

TABLE 1

Weld Deposit Composition, wt. %

| Ingredient | Inventive Flux Cored Electrode | | | ENiCrMo-6 Stick | ENiCrMo3 | ENiCrMo4 |
| --- | --- | --- | --- | --- | --- | --- |
| | Good | Better | Best | | | |
| Carbon | ≤0.15 | ≤0.08 | ≤0.05 | ≤0.08 | ≤0.10 | ≤0.02 |
| Manganese | ≤6.0 | ≤4.0 | ≤3.0 | ≤3.0 | ≤0.50 | ≤1.0 |
| Silicon | ≤1.0 | ≤0.7 | ≤0.5 | ≤0.4 | ≤0.50 | ≤0.2 |
| Phosphorous | ≤0.025 | ≤0.017 | ≤0.010 | ≤0.015 | ≤0.02 | ≤0.03 |
| Sulfur | ≤0.020 | ≤0.015 | ≤0.010 | ≤0.015 | ≤0.015 | ≤0.03 |
| Chromium | 12.0-20.0 | 15.0-19.0 | 15.5-17.0 | 12.5-13.5 | 20.0-23.0 | 14.5-16.5 |
| Nickel | ≥55.0 | ≥65 | 65-70 | 66-70 | ≥58 | Remainder |
| Molybdenum | 5.5-7.5 | 5.6-7.0 | 5.7-6.3 | 5.7-6.3 | 8.0-10.0 | 15.0-17.0 |
| Niobium* | 1.2-1.8 | 1.2-1.7 | 1.3-1.5 | 1.4-1.6 | 3.15-4.15 | — |
| Iron | ≤12 | ≤9 | ≤6 | ≤6 | ≤5.0 | 4.0-7.0 |
| Copper | ≤0.3 | ≤0.2 | ≤0.1 | ≤0.04 | ≤0.50 | ≤0.50 |
| Tungsten | 0.5-4.0 | 0.8-2.5 | 1.3-1.6 | 1.3-1.6 | — | 2.5-3.5 |
| Titanium | — | — | — | — | ≤0.4 | — |
| Cobalt | — | — | — | — | — | ≤2.5 |
| Vanadium | — | — | — | — | — | ≤0.35 |

*Includes tantalum

From Table 1 it can be seen that, in terms of weld deposit composition, while the inventive flux cored electrode is similar to the stick electrode used for making vertical welds in high nickel steels (ENiCrMo-6), it is considerably different from the flux cored welding electrodes used in automatic welding processes for producing horizontal welds in these very same steels.

Metal Sheath

The solid metal element from which the inventive flux cored electrode is made, i.e., its metal sheath, is desirably made from an alloy containing about 80% nickel and 20% chromium. Specific examples of such alloys include SG-NiCr20 and NiCr 70.20 These alloys are readily available, commercially, in strip form, which helps make manufacture of the inventive flux cored electrodes simple and inexpensive.

Note that using a nickel/chromium alloy to make the solid metal element of the inventive flux cored electrode represents a significant departure from the way stick ENiCrMo-6 is made, whose solid metal element, i.e., its wire core, is normally made from 100% nickel or NiCr20 grades.

TABLE 2

Particulate Composition, wt. %

| Ingredient | Inventive Electrode Particulate Core | ENiCrMo-6 Stick Particulate Coating |
| --- | --- | --- |
| Fluorides | | |
| CaF$_2$, Na$_3$AlF$_6$, NaF, K$_3$AlF$_6$ | 1-10 | 5-20 |
| Carbonates | | |
| | 0 | 10-30 |
| Metal Oxides | | |
| SiO$_2$, TiO$_2$, ZrO$_2$, Mn$_2$O$_3$, Al$_2$O$_3$, Cr$_2$O$_3$, Fe$_2$O$_3$ | 0-30 | <5 |
| Metal Alloy Powders/Compounds | | |
| Cr | 0 | <30 |
| Fe | 0-30 | <30 |
| Mo | 5-30 | <20 |
| Nb | 8-20 | <10 |
| W | 2-18 | <5 |
| Mn | 0-25 | <10 |
| Deoxidants | | |
| Fe, Al, Ti, Mg in various combinations | 0-25 | Si = <5<br>Ti = <5 |

Preferably, the combined amounts of fluorides and metal oxides in the particulate core of the inventive flux cored electrode represent about 10 to 30 wt. %, of the entire particulate core. Also, the total amount of the particulate core of the inventive flux cored welding electrode represents about 15 to 45 wt. %, of the inventive flux cored welding electrode as a whole. This is in contrast to conventional stick electrode ENiCrMo-6 in which its particulate coating represents approximately 40-50 wt. % of the electrode as a whole.

Shielding Gas

The inventive flux cored welding electrode should be used with an externally supplied shielding gas. In this context, an "externally supplied" shielding gas will be understood to refer to a shielding gas that is supplied in the form of a gas to the welding site from an external source.

Normally, however, an externally supplied shielding gas will be used when the inventive flux cored welding electrode is used to weld high nickel steel workpieces. Conventional shielding gasses can be used for this purpose such as 100% $CO_2$, Ar containing 15 to 25% $CO_2$ and the like.

Properties

Vertical welds produced in high nickel steel workpieces when welded with automatic welding equipment using the inventive flux cored welding electrode exhibit the mechanical properties set forth in the following Table 4. For comparison, the properties exhibited by the vertical welds produced in the same steels by stick welding with the traditional stick electrode used for this purpose, ENiCrMo-6, are also included in Table 3.

TABLE 3

Mechanical Properties of Welds formed by Inventive Electrode in High Ni Steels:

| Property | Inventive Electrode | | ENiCrMo-6 stick, |
|---|---|---|---|
| | Minimum | Typical | Typical |
| Rm, MPa | 690 | 750 | 725 |
| Rp 0.2%, MPa | 420 | 460 | 425 |
| A (4d), % | 30 | 42 | 39 |
| A (5d), % | 25 | 40 | 32 |
| Z. % | — | 40 | — |
| CVN, J  −196° C. | 47 | 75 | 90 |
| −100° C. | — | 80 | — |
| +20° C. | — | 95 | 100 |
| Hardness, weld cap, HV 10 | — | 180 | — |
| Hardness, weld mid-section, HV 10 | — | 200 | — |

As can be seen from Table 3, the quality of the welds produced by the inventive flux cored welding electrode are at least as good, and in some instances better than, the properties obtained when the traditional stick welding process is used. This is quite surprising, given that the vertical welds produced by all prior attempts to weld high nickel steel with automatic welding equipment were less optimal in one or more of strength, impact toughness at −196° C., susceptibility to welding hot cracking and bead shape.

Although only a few embodiments of this invention have been described above, it should be appreciated that many modifications can be made without departing from the spirit and scope of the invention. All such modifications are intended to be included within the scope of this invention, which is to be limited only by the following claims.

The invention claimed is:

1. A flux cored welding electrode for welding 5-9% nickel steel workpieces by flux cored arc welding (FCAW) processes, the flux cored welding electrode comprising a particulate core and a metal sheath surrounding the particulate core,
wherein the total amount of flux core in the flux cored welding electrode represents about 15 to 40 wt. % of the flux cored welding electrode as a whole,
wherein the weld deposit produced by the welding electrode comprises ≤0.15 C, ≤6.0 Mn, ≤1.0 Si, ≤0.025 P, ≤0.020 S, 12.0-20.0 Cr, >55.0 Ni, 5.5-7.5 Mo, 1.2-1.8 Nb+Ta, ≤12 Fe, ≤0.3 Cu and 0.5-4.0 W,
wherein the metal sheath is made from an alloy which is free of added Ti, and further
wherein the particulate core is free of added carbonates.

2. The flux cored welding electrode of claim 1, wherein the metal sheath is made from an alloy containing about 80% nickel and 20% chromium.

3. The flux cored welding electrode of claim 2, wherein the metal sheath is made from alloy SG-NiCr20 or NiCr 70.20.

4. The flux cored welding electrode of claim 2, wherein the weld deposit composition comprises ≤0.08 C, ≤4.0 Mn, ≤0.7 Si, ≤0.017 P, ≤0.015 S, 12.8-16.0 Cr, ≥66 Ni, 5.6-7.0 Mo, 1.2-1.7 Nb+Ta, ≤9 Fe, ≤0.1 Cu and 0.8-2.5 W.

5. The flux cored welding electrode of claim 4, wherein the weld deposit composition comprises ≤0.04 C, ≤2.5 Mn, ≤0.4 Si, ≤0.010 P, ≤0.010 S, 13.5-14.5 Cr, 66-70 Ni, 5.7-6.3 Mo, 1.3-1.5 Nb+Ta, ≤6 Fe, ≤0.04 Cu and 1.3-1.6 W.

6. The flux cored welding electrode of claim 1, wherein the weld deposit composition comprises ≤0.08 C, ≤4.0 Mn, ≤0.7 Si, ≤0.017 P, ≤0.015 S, 12.8-16.0 Cr, ≥66 Ni, 5.6-7.0 Mo, 1.2-1.7 Nb+Ta, ≤9 Fe, ≤0.1 Cu and 0.8-2.5 W.

7. The flux cored welding electrode of claim 6, wherein the weld deposit composition comprises ≤0.04 C, ≤2.5 Mn, ≤0.4 Si, ≤0.010 P, ≤0.010 S, 13.5-14.5 Cr, 66-70 Ni, 5.7-6.3 Mo, 1.3-1.5 Nb+Ta, ≤6 Fe, ≤0.04 Cu and 1.3-1.6 W.

8. The flux cored welding electrode of claim 2, wherein the particulate core represents about 15 to 45 wt. % of the inventive flux cored welding electrode as a whole.

9. The flux cored welding electrode of claim 8, wherein the particulate core contains no more than 10 wt. % fluorides.

10. The flux cored welding electrode of claim 8, wherein the particulate core consists essentially of 1-10 wt. % fluorides, 0-30 wt. % metal oxides, 0-25 wt. % deoxidants and the balance metal alloy powders and compounds.

11. The flux cored welding electrode of claim 1, wherein the particulate core represents about 15 to 45 wt. % of the inventive flux cored welding electrode as a whole.

12. The flux cored welding electrode of claim 11, wherein the particulate core contains no more than 10 wt. % fluorides.

13. The flux cored welding electrode of claim 11, wherein the particulate core consists essentially of 1-10 wt. % fluorides, 0-30 wt. % metal oxides, 0-25 wt. % deoxidants and the balance metal alloy powders and compounds.

14. A flux cored arc welding (FCAW) process for joining two workpieces made from high nickel steel containing 5 to 9 wt. % nickel, the process comprising welding the workpieces together using the flux cored welding electrode of claim 1.

15. The flux cored arc welding process of claim 14, wherein welding is accomplished by means of automatic welding equipment.

16. The flux cored arc welding process of claim 15, wherein an external shielding gas is supplied to the welding site when the two workpieces are being welded together.

17. The flux cored arc welding process of claim 16, wherein a vertically-oriented seam is being welded.

18. The flux cored arc welding process of claim 15, wherein a vertically-oriented seam is being welded.

* * * * *